United States Patent [19]

Wilmer

[11] 4,071,855
[45] Jan. 31, 1978

[54] ENCODER AND DECODER FOR BANDWIDTH COMPRESSION

[75] Inventor: Michael E. Wilmer, Portola Valley, Calif.

[73] Assignee: Xerox Corporation, Stamford, Conn.

[21] Appl. No.: 663,311

[22] Filed: Mar. 3, 1976

[51] Int. Cl.² .............................................. H04N 7/12
[52] U.S. Cl. ...................................... 358/260; 358/261
[58] Field of Search ............. 178/6, DIG. 3; 358/260, 358/261

[56] References Cited

U.S. PATENT DOCUMENTS 3,914,538  10/1975  Perreault ................................. 178/6
3,950,609  4/1976  Tanaka ............................ 178/DIG. 3

Primary Examiner—Howard W. Britton
Attorney, Agent, or Firm—M. J. Colitz, Jr.; T. J. Anderson; B. P. Smith

[57] ABSTRACT

Apparatus for segmenting a buffer memory into two-dimensional sectors such buffer memory having stored herein, in scan-by-scan format, bits representing the image of a document. The sectors comprise sections of adjacent scan lines arranged in a two dimensional array. Included in the apparatus is an address generating means which provides the address arrays for such sectors during the segmenting sequence and an encoding means which inspects the data in each segment. In the instances where all of the data in one sector represents background image a single bit code is transmitted. In all other instances the sector data is transmitted in its entirety. The same address generating and encoding means can be utilized in the receiving mode to reconstruct the code into corresponding data arrays to thus provide an image.

6 Claims, 4 Drawing Figures

ENCODER AND DECODER FOR BANDWIDTH COMPRESSION

BACKGROUND OF THE INVENTION

1. Field of the Invention

The present invention relates to facsimile transmission systems, and more particularly to data compression techniques useful in reducing the amount of data transmitted during the scanning of a document.

2. Description of the Prior Art

In the transmission of document images over long distances, digital techniques based on a threshold black/white discrimination have been practiced in the past. Such technique has been found particularly useful when communication is made over standard voice frequency telephone networks. Telephone networks are generally quite limited in bandwidth and fidelity therefore transmission of linear signals similar to that practiced in television image transmission, is often less than adequate.

Accordingly, many prior art techniques have been developed for breaking down the document image into a scan-by-scan series of discrete picture elements or, as commonly referred to "pixels", each pixel indicating, in terms of binary code, whether the local reflectivity of the document is below or above a certain threshold. Thus, many very fine pixels are transmitted and reconstruct at the receiver the document image. The volume of data produced by this scanning technique is necessarily high for any acceptable level of fidelity and many bandwidth compression systems have been developed in the past for compressing such data.

A typical prior art technique for data compression of digitized facsimile images is a technique commonly referred to as "run-length compression". This technique utilizes, to some advantage, the fact that if an image is present on the document, the distinct characteristics thereof will normally be much larger than any singular pixel. Thus, in a scan-by-scan transmission a series of white pixels is typically converted to a count code, like a binary series count code, which is then terminated by a transition code to the black reflectivity level. The black level can then be similarly coded in terms of pixel count until a full scan line is thus completed. This technique, while quite useful for its purpose, is still less than optimal since, the largest compression factor which can be achieved is that of a serial to binary series conversion. To augment such compression schemes, there have been devised in the past, additional techniques which convert the binary code to some other base as for example, a base of six, and thereby exchange the length of transmission for phase modulation. Even this latter technique, however, has been found also limiting particularly when the cost of long distance telephone communication is considered.

Both of the above techniques, however, do not discriminate between character and background. Since in most documents background represents the bulk of the data transmitted the above prior art techniques which compress the data in serial form necessarily transmit background at the same level of compression. Thus, depending on the number of black and white intervals within one particular image series or scan series, there is a minimum level of data compression which can be achieved by these techniques.

Of the several two-dimensional compression techniques disclosed in the prior art, most rely on arbitrary sub-arrays achieved by steps like folding, wherein a two-dimensional image is divided into elemental areas and is successively folded upon itself. During each folding process, the data on one side of the fold is correlated with the data in the other side of the fold to determine non-similarity. In this latter case, the process of correlating folded images involves relatively complicated logic operations. Thus, there are no data compression systems presently known which are particularly suited for a scan-by-scan facsimile device and which subsequent to scanning reduce the data bulk according to its character.

SUMMARY OF THE INVENTION

Accordingly, it is the general purpose and object of the present invention to provide a facsimile data compression device wherein facsimile data is retained in a buffer memory, such memory being subsequently segmented into two-dimensional sectors. The sectors containing only background data are then transmitted by a single leader bit.

Other objects of the invention are to provide a data compression technique which can be conveniently combined with various other prior art compression techniques.

Yet further objects of the invention are to provide a data compression technique for binary coded facsimile data which is easily implemented by conventional integrated circuit elements.

These and other objects are accomplished within the present invention by combining a conventional line-by-line scanning facsimile engine with a buffer memory of one line width and $n$ lines height. Thus, a document is scanned as a series of discrete picture elements or pixels and is stored in a line-by-line arrangement in the buffer memory. At the completion of a full buffer memory loading, the memory contents are segmented into two-dimensional arrays or sectors. Each sector is then inspected to see if it contains only background data. If one data sector for example, includes all background data, ie. all white data code, a single leader bit communicates this state to the receiver. Should the next data sector contain some black data elements a serial code representing the whole sector is transmitted. Since in most instances a document, such as a printed page, is predominantly white, this technique of data compression achieves large savings in communication time.

To achieve this technique, a serial, laser scanning device is utilized to scan the document. Such devices, commonly referred to as a facsimile engine, comprise a laser source which emits a beam onto an articulated mirror and through this articulation is scanned across the document. The beam reflection from the document is then applied to a strip photo detector which, produces an output signal indicative of the local reflectivity of the document. The output of the photodetector is then applied to a threshold trigger circuit. Concurrently, a sweep generator, utilized to articulate the mirror, is connected to an A-D converter which, in the term of binary code at the output thereof, generates an address for the inscription of the trigger output into a memory buffer. This address, in a manner quite conventional in the art, selects the particular bit position at which the trigger output is inscribed. For the purposes herein, the memory buffer may comprise a plurality of semiconductor memory devices having the storage capacity of several lines of scan data. At the completion of a buffer load, and during the next return segment of the mirror articulation signal, a sequence of addresses in two-dimensional sector format extracts the buffer memory contents into a shift register which at the completion of each sector is inspected in parallel. If the sector contains only background data only a single leader bit is recorded into a transmission memory and the sector data is dropped. If, however, there is non-background data (black) in the sector the whole sector content is transmitted. The state of the leader bit identifies, in the receiver, whether dropped sector data is to be locally generated or whether transmitted data is available.

DESCRIPTION OF THE SPECIFIC EMBODIMENT

The present invention is generically directed at a void compression technique and while implemented by one particular selection of chips, such implementation is illustrative only. It is to be understood that those skilled in the art may find alternative arrangements of logical elements and no intent to limit the scope of the invention is therefore expressed by the choice of this illustration. It is to be further understood that the selection of chips in this instance is on the SSI (Small Scale Integration) or MSI (Medium Scale Integration) level only and LSI (Large Scale Integration) alternatives thereto are presently possible. Furthermore, it is possible to implement the logical operations disclosed herein by a software routine on a general purpose microprocessor with the microprocessor then providing the function of the various elements disclosed.

Figure 1:
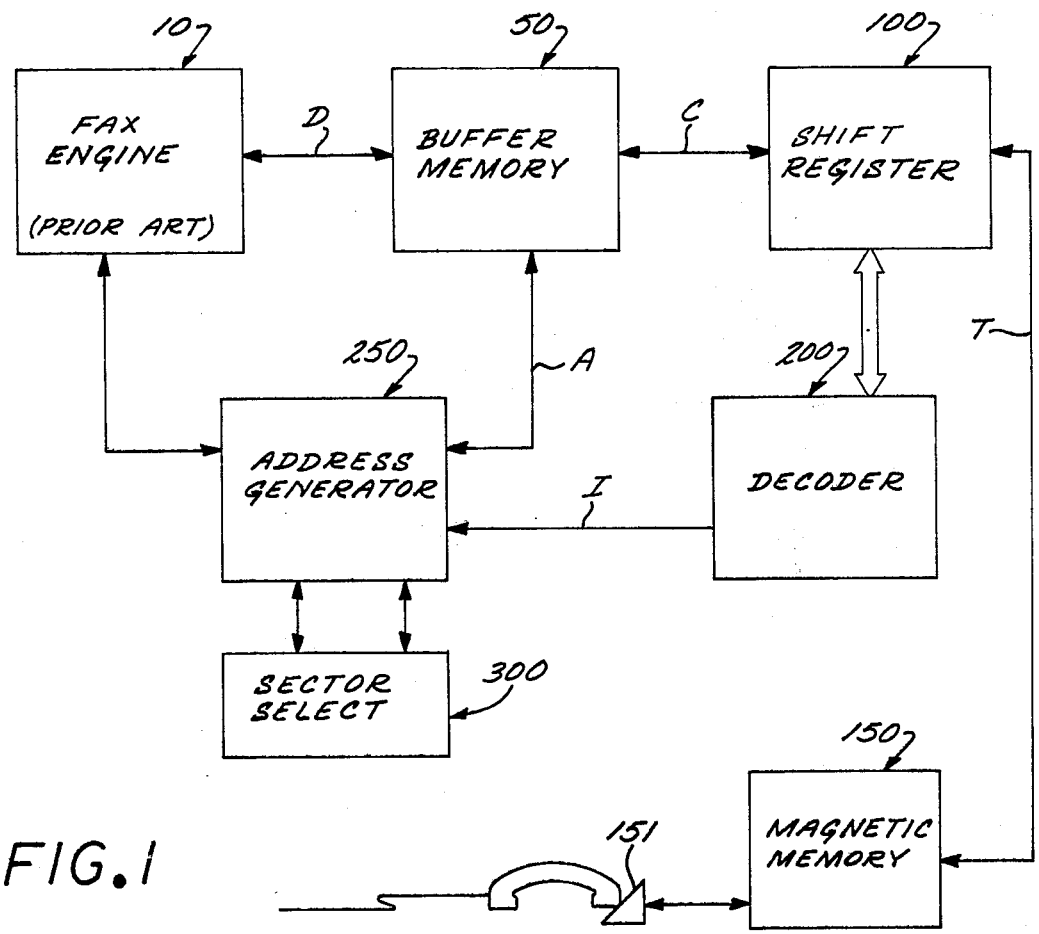
FIG. 1 is a generalized block diagram of a system constructed according to the present invention.

As shown in FIG. 1, a facsimile engine generally designated by the numeral 10 is connected by way of a bi-directional data lead D to a random access buffer memory 50. For purposes herein, the facsimile machine 10 can be any facsimile device such as, for example, the device disclosed in the U.S. Application Ser. No. 391,696 filed Aug. 27, 1975 by Perrault, et al, now U.S. Pat. No. 3,914,538 and assigned to the same assignee. Buffer memory 50, in turn, is a random access semiconductor storage device having a fixed relationship between the number of scan lines of facsimile data and its internal contents. A bidirectional compressed data lead C connects the other side of buffer memory 50 to a shift register device 100. Shift register 100, in turn, interfaces across a transmission lead T with a transmission storage buffer 150 which can be any magnetic or semiconductor memory storage device. The storage device 150 is then connected by way of a coupler 151 to a telephone network for either transmission or reception.

In addition to the above elements, the shift register 100 is also connected, in parallel, to an encoding circuit, shown generally by the numeral 200. In the receiving mode, the function for circuit 200 is to inspect a leader code at the front of each message sequence received and, on the basis of that inspection, to identify whether the succeeding data bits in the shift register 100 are data bits corresponding to a serial bit representation of a selected data sector or whether the next bit is yet another leader code. Two leader codes in succession immediately establish that at least the first leader code represents a void array.

As will be described in more detail hereinbelow, such an indication of a void array calls for a bit-by-bit reconstruction of the void code in the buffer memory 50. To accomplish this function, the decode circuit 200 feeds an input lead I to an address generating circuit 250 which then provides an address signal A back to the buffer memory 50. Associated with the address generator circuit is a sector selecting circuit 300 which, besides the connection with the generator 250, also provides a clock signal to the shift register 100.

In addition to these connections, there is a raw data lead R between the facts machine 10 and, again, the address generator 250. The above functional elements are bidirectional and in addition to the transmitting mode also operate to reconstruct the void sectors during reception.

Figure 2:
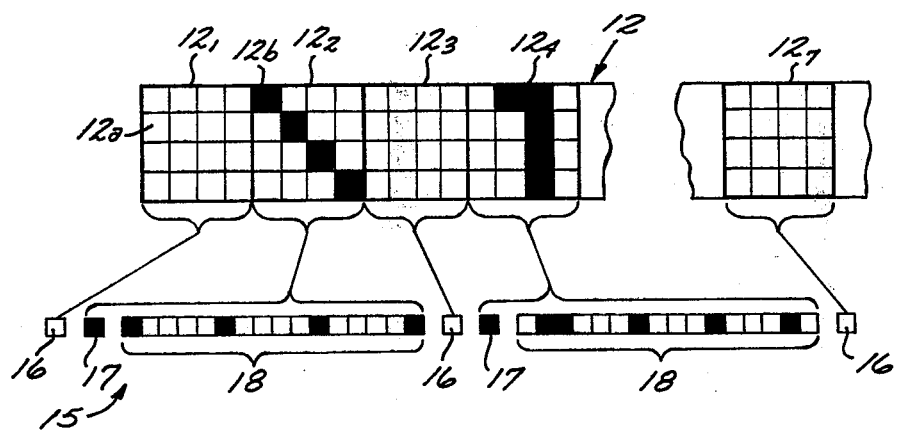
FIG. 2 is a diagrammatic illustration of a memory contents array in conjunction with a serial bit stream transmitting such.

With this generalized description of functional breakdown, the technique carried out by the system will now be set forth with particular reference to FIG. 2.

As shown in FIG. 2, a document is converted to an array of discrete pixels 12, shown herein as an array four pixels deep and twenty-eight pixels wide. It is to be noted that the selection of the size of the array in this instance is arbitrary and the row count of pixels across a typical document page is substantially higher than that shown. Specifically, it has been found that for typical print detail, a vertical density of about 96 pixels per inch and a corresponding horizontal density, is the minimum density for typical type fonts.

For the purposes herein, the array of pixels 12 is divided into four-by-four pixel array sectors, designated herein as sectors $12_1 - 12_7$, each sector thus including sixteen pixels. In the illustration selected, sector $12_1$ contains nothing but white pixels and is therefore a background or void sector. Sector $12_2$, on the other hand, includes part of a typewritten character and therefore includes certain pixels which represent the black reflectivity of the document. Each pixel is generally designated by the numeral 12 the black and white pixels being further distinguished by the subscript $a$ and $b$ shown immediately below the array of pixels 12 is a serial bit stream of binary data designated herein as a bit stream segment 15, which illustrates a code sequence compressed according to the present invention. Within the bit stream segment 15, there are bits 16 and 17, bit 16 designating a logical low or zero while bit 17 designating a logical high or a logical one bit. A low leader bit (i.e. leader bit 16) is selected to indicate a four-by-four void sector which is not transmitted and therefore must be followed by yet another leader bit. If the next leader bit is high, i.e., a bit 17 a sixteen bit stream of data follows indicating the contents of sector $12_2$ for example.

It is to be understood that the general approach to compression disclosed herein is based on compression of void sectors. Thus, a sector such as the sector $12_1$ containing nothing but white pixels $12a$ does not require any data for its reconstruction. Consequently a leader, such as a leader bit 16, indicating a void sector such as sector $12_1$, necessarily must be followed by yet another leader bit. The examples selected herein, the sector $12_2$ includes portions of a character and therefore must be transmitted in its entirety since the disposition of the various parts of the character within the sector are now necessary. Thus, a leader bit 17 is followed by sixteen discrete bits shown as a data field 18.

Should the sectors be selected substantially larger than four-by-four pixel sectors, it is possible to utilize the standard prior art compression techniques in reducing the data field 18 even further. A similar approach can be made for the various other sectors, such as sectors $12_3 - 12_7$, wherein in each instance a leader bit indicating a logical low such as a leader bit 16, must be followed by yet another leader bit. It is thus this logical algorithm that controls the operation of the invention herein.

Referring back to FIG. 1, the various elements will now be once more taken up with particular reference to the operation set forth immediately above. As will be appreciated by those skilled in the art, the general function of the system disclosed encompasses both the transmitting and the receiving operational states. While the system is shown with a terminating link illustrated as coupler 151, other equivalents such as radio transmission are acceptable. During reception, coupler 151 loads directly onto the magnetic memory storage 150 which thus decouples the transmission rate from the internal clock rate of the inventive system. At the conclusion of any one communication interval, or even at the completion of several such communicating intervals, the magnetic memory 150 can then be serially unloaded into the shift register 100. Since this unloading is effectively independent of the cost of long distance communication, any output rate compatible with the system can be utilized. As the data and leader bits stored on the magnetic memory 150 are unloaded into the shift register 100, the decode circuit 200 provides the logical inspection of the leaders. As each leader passes through the shift register, the address generator 250, with the sector select circuit 300, addresses a particular memory sector in the buffer memory 50 and fills in the sixteen void bits should a low leader bit 16 appear at the input.

In similar manner, the transmission process can be performed. Specifically, the fax engine 10 loads serially scan data onto the buffer memory 50 while concurrently selecting the address locations for each data bit by way of the address generator 250. Once the buffer memory 50 is so loaded, a reverse sequence through shift register 100 and decode circuit 200 takes place to thus inscribe on the magnetic storage 150 the void compressed code. At a subsequently selected time, the contents of storage 150 may be transmitted through the network or coupler 151.

Figure 3A:
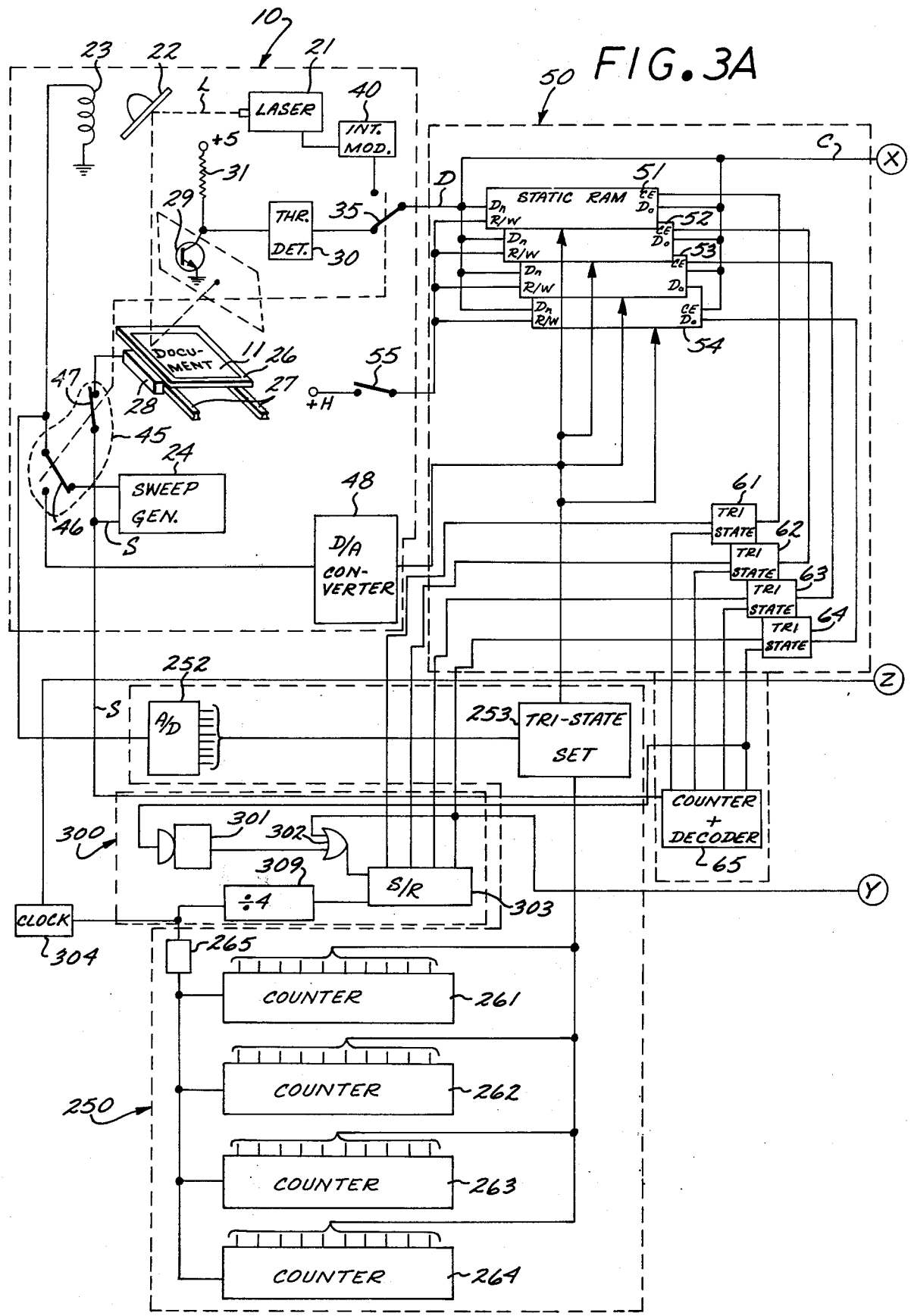
FIG. 3 is a detailed block diagram shown segmented as FIGS. 3A and 3B which together illustrate the various chips connected to perform the functions of the various blocks disclosed in FIG. 1.
Figure 3B:
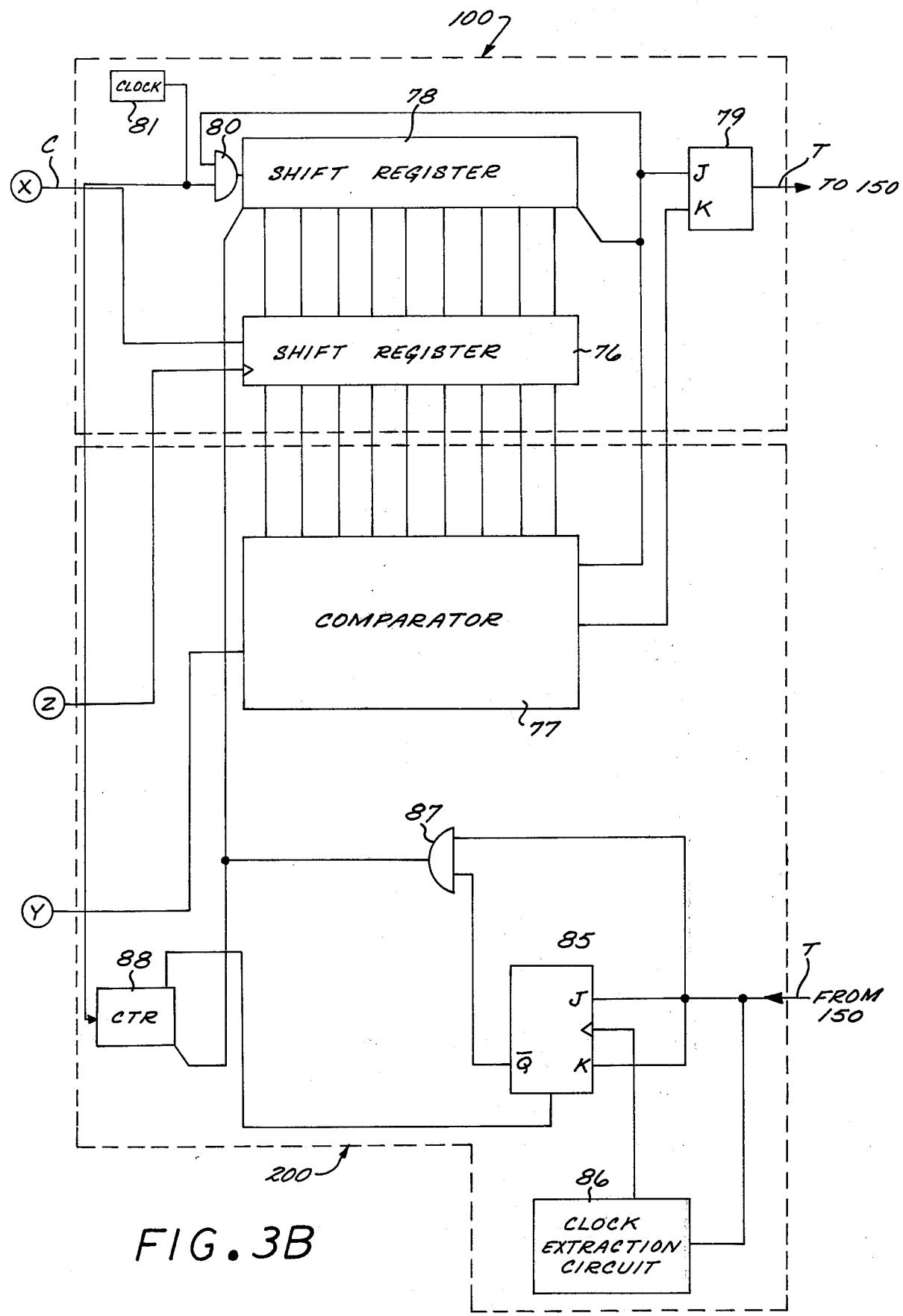

With this functional description, a specific embodiment will now be taken up by reference to FIGS. 3A and 3B these figures, in combination, illustrate the function of the decoder 200, the shift register 100, the address generator 250 and the sector select 300, are each implemented by medium scale integration (MSI) chips, the implementation of the buffer memory 50 being made by way of chips which are more properly characterized as large scale integration or LSI. The fax engine 10 itself is now generally known in the art, and various implementations thereof are compatible with the system disclosed herein. For purposes of illustration, a fax engine such as that disclosed in the above referenced U.S. Application Ser. No. 391,696 is useful herein and is therefore described once more, on the general function level, in order to complete the illustration.

Specifically included in the fax engine 10, is a laser source 21 emitting a beam of light L towards an articulated mirror 22 which, in the manner of a galvanometer, rotates through a section of an arc according to the electrical signal applied to a coil 23. This electrical signal is, in turn, generated by a sweep generator 24 which, in addition thereto, provides a return strobe signal S at the completion of each mirror scan. During the articulation of the mirror 22, the beam of light L is translated transversely across a document 11 which is mounted on a translating platform 26 to be translated for the next scan on rails 27 by a translation mechanism 28 responding to the strobe signal S. As the beam of light L is thus translated across the document 11, in a raster scan pattern, the reflection thereof is picked up on a strip phototransistor 29 which, by the collector thereof, drives a threshold detector 30.

In the foregoing illustration of the facsimile engine 10 a strip phototransistor 29 is utilized which operates as a single transistor and is thus illustrated. More specifically, phototransistor 29 includes a collector resistor 31 tied to a source of excitation $+V$ while the emitter is connected to ground. The use of the phototransistor 29 and the associated threshold detector 30, however, are necessary only during transmission. During reception this function is not necessary. Accordingly, the output of threshold detector 30 is connected schematically to one of the two terminals of a two-position switch 35 which, when articulated to the state shown, provides the input signal D to the buffer memory 50. When in the other state, an output path from the buffer memory 50 is formed. In this latter state, switch 35 connects to the input of an intensity modulation circuit 40 which assumes the function of a pulse-width modulator. The output of the intensity modulator 40 then controls the laser 21 to reconstruct the image.

In a similar manner, the articulation of mirror 22 has two separate origins, one for transmission and a second for reception. As previously stated, sweep generator 24, during transmission, provides the source of the electrical signal to the coil 23. During reception a D/A converter 48 provides this function. For that reason the signal path to the coil includes, once again, a two-position switch 45 which, in addition to the function described immediately above, also provides an alternative path for the return strobe signal S and therefore comprises two separate arms 46 and 47 ganged for common articulation; arm 46 having the common pivot attached to the upper end of coil 23 while arm 47 having the common pivot connected to the input of the advancement mechanism 28.

With the foregoing description of the facsimile machine 10 as practiced in the prior art, the detail implementation of the buffer memory 50 will now be taken up. As implemented herein, the storage portion of the buffer memory 50 comprises four static RAMs (random access memories) 51, 52, 53 and 54, such as the Model 2102 static RAM made by the Intel Corporation, 3065 Bowers Avenue, Santa Clara, California 95051. RAMS 51-54 are 1024 bits wide times one bit deep. It is therefore contemplated to utilize 1024 pixels for each sweep of the mirror 22. The input terminal of the RAMs 51-54, identified as terminals $D_{in}$ in each instance, receive in parallel the arm of switch 35 which thus applied signal D into each memory section. Each static RAM further includes the conventional read/write terminals identified as terminals R/W which are collected in common to the arm of yet another switch 55 which, in one of its states, connects to a logical high or $+H$ signal. In addition to the above terminals, each static RAM 51-54 includes a chip-enable terminal, identified herein as terminal CE, a corresponding one of the latter terminals, in turn, connecting to one associated tri-state buffer 61-64. During the tranmission mode, or during the mode when the contents of the documents 11 are placed into storage onto the static RAMS 51-54, the RAMs are selected in sequence by the corresponding tri-state buffer according to the return strobe on the sweep generator 24. This is accomplished by connecting signals S from sweep generator 24 to a counter-decoder 65 which provides four separate signals to the respective tri-state buffers 61-64. In this state, the output of the threshold detector 30 is stored onto the RAM selected by the chip enable signal.

Switches 35 and 45 are ganged in common for the selection of the receiver or the transmitter mode. In the transmitting mode, switch 45 connects the output of sweep generator 24 to A/D converter 252. Converter 252 then provides the requisite ten bits of data to generate the 1024 bits of address locations in the RAM selected by decoder 65. This address output of converter 252 is, once again, connected through a ganged tri-state buffer set 253 in parallel to each of the static RAMs 51-54.

Once these four static RAMs are loaded with four scan lines of data, the process of unloading the contents thereof into the shift register 100 is initiated. It is to be noted that the loading sequence of data into the static RAMs is essentially controlled by the mechanical time constants of the fax engine 10. These are normally substantially lower than the logic switching rates or the rates at which the data can be transferred in and out of the RAMs. The disparity in rates is effectively so high that the whole unload sequence can occur within the return stobe period at the completion of the fourth loading of a static RAM. Thus, as the chip enable circuit embodied in the decoder 65 reaches the fourth static RAM 54, the sector selector circuit 300 is enabled.

Included within circuit 300 is a one-shot 301, initiated at the return or the negative transient at the input of the tri-state buffer 64 or the fourth output of decoder 65, which then provides one input to an OR gate 302. OR gate 302, in turn, applies a data input to a four-bit shift register 303 clocked by an unload clock 304 and recirculating the fourth bit position back to the input of gate 302. The parallel outputs of shift register 303 then select the particular tri-state buffers 61-64.

Concurrently with this operation the address geneator 250 provides a sequence of address codes generated artificially by four ten-bit counters 261, 262, 263 and 264 which are driven, through a delay 265, from the output of clock 304. To accomplish the requisite sectoring during the unload sequence, counters 261-264 are enabled by the same four bits of output from the four-bit shift register 303 which is concurrently clocked by clock 305 across a divide-by-four counter 309. Thus, it is the same bit that selects the particular chip enable terminal in the RAMs 51-54 and the corresponding counter. In this manner, a segmented sequence, four-bits wide, is cascaded through the ten-bit counters 261-264, unloading the static RAMs in four-by-four memory field sectors. During this unload procedure, the output terminals identified as $D_0$ in RAMs 51-54, are all collected as the signal C (across the off-page connector X) at the input of a sixteen-bit shift register 76. Shift register 76 is advanced, in synchronism, by the clock 304 and is parallel loaded into a comparator 77. Comparator 77 is enabled by the last position of shift register 303 (across off page connector Y), and for any values other than zero at the input thereof, will enable the side-loading of yet another shift register 78 with the sixteen-bits of data on shift register 76. Concurrently comparator 77 drives the J terminal of a J-K flip-flop 79 which provides the leader bit as disclosed hereinabove. During the next successive loads of shift register 76, shift register 78 and the leader bit in flip-flop 79 are unloaded into the magnetic memory 150 by a high speed clock 81 collected at an AND gate 80 with the "not equal" terminal. Should there be a zero input to comparator 77, the flip-flop 79 is set to a complementary state and no shift-out of the contents of shift register 78 takes place. In this manner, only a single bit of data or a single leader bit identifing a void sector is generated for transmission.

In the receiving mode, no encoding or compression is necessary and only the expansion of the voids takes place. To accommodate this void expansion data and leader bits from memory 150 are serially input into a J-K flip-flop 85 which is also clocked by a clock extraction circuit 86 operating as a typical MODEM clock extraction circuit. If the leader bit is low, the Q output of the flip-flop 85, collected with the leader bit at an AND gate 87, enables a four bit counter 88 and concurrently the shift register 78. Counter 88 is thus driven in common with the shift register 78 by clock 81 and at the end of a sixteen cycle count resets flip-flop 85. Shift register 78 is then unloaded through shift register 76 into the buffer memory with concurrent operation of shift register 303. In this manner the reconstructed void data is allocated in the appropriate cell positions within the memory field.

Thus, the same circuit elements used in transmission are also utilized during the receiving state with only few additional elements provided to accommodate this change in state.

As result of this technique the effective reduction in data has been experimentally found to provide the following compression ratios:

| Document 1 (light to medium text density) | |
|---|---|
| Void Matrix | Compression |
| 1 × 32 | 4.36 — 1 |
| 2 × 8 | 4.96 — 1 |
| 2 × 16 | 4.81 — 1 |
| 4 × 4 | 5.33 — 1 |
| 4 × 8 | 5.02 — 1 |

| Document 2 (medium to heavy text density) | |
|---|---|
| Void Matrix | Compression |
| 1 × 32 | 3.60 — 1 |
| 2 × 8 | 3.84 — 1 |
| 2 × 16 | 3.80 — 1 |
| 4 × 4 | 3.79 — 1 |
| 4 × 8 | 3.75 — 1 |

| Document 3 (high text density) | |
|---|---|
| Void Matrix | Compression |
| 1 × 32 | 1.25 — 1 |
| 2 × 8 | 1.82 — 1 |
| 2 × 16 | 1.50 — 1 |
| 4 × 4 | 1.98 — 1 |
| 4 × 8 | 1.72 — 1 |

On the basis of these compression ratios, a four-by-four matrix size appears close to the optimum for practically all levels of print density. These compression ratios can be further improved by incorporating the prior art compression techniques such as run-length compression and therefore effect additional data compression over and above the basic compression scheme. It is to be noted that the compression ratios identified above are for the scan density previously mentioned. It is found that this density is the minimum density necessary to facilitate reproduction of characters printed at a pitch of either 60 or 72 increments per inch.

Some of the many advantages of the present invention should now be readily apparent. The invention provides, by way of conventional circuit elements, a system which greatly reduces the amount of data flow during facsimile communication. When amortized over many communication periods and particularly over the cost of long-distance telephonic communication, the system costs are quite negligible when compared to the total cost of communication. In addition, the compression techniques herein disclosed have no significant impact on the fidelity of character reproduction. Thus, by way of few integrated circuits, a technique is achieved which both reduces the cost of communication and does not effect fidelity. In addition, the selection of chips herein disclosed is not critical, it being quite feasible to incorporate the functions achieved by these chips in any LSI device such as an LSI microprocessor.

Obviously many modifications and variations to the above disclosure can be made without departing from the spirit of the invention. It is therefore intended that the scope of the invention be determined solely dependent on the claims hereto.

I claim:

1. A bandwidth compression device adapted for use with a facsimile communication system comprising:

buffer means for storing in line-by-line format facsimile data;

segmenting means connected to said buffer means for selecting line sections in a column alignment from said buffer means;

coding means connected to receive said column of line sectors for producing serial signals including a first leader code when all bits in said column of line sectors are of a first polarity and a second leader code followed by a bit serial stream of said bits in said column of line sectors when any ones of said bits are of a second polarity;

transmission means connected to receive said signal from said coding means for transmission;

expansion means connected to said transmission means for producing a serial stream of bits of said first polarity upon receipt of said first leader code; and allocating means connected to said expansion means and said buffer means for allocating said serial bits into a preselected array of line sectors in said buffer means.

2. Apparatus according to claim 1 wherein:
said segmenting and allocating means each include an address generator adapted to select vertically aligned line sectors in said buffer means.

3. Apparatus according to claim 2 wherein:
said first and second leader codes are single binary bit codes.

4. Apparatus according to claim 3 wherein:
said buffer means includes a random access memory.

5. Apparatus according to claim 4 wherein:
said transmission means includes an interface memory at either end thereof.

6. Apparatus according to claim 5 wherein:
said random access memory comprises a two dimensional memory array having a row dimension equal or greater than the number of bits in a line scan in said facsimile communication system.

* * * * *